(12) United States Patent
Shekarriz

(10) Patent No.: US 9,968,904 B2
(45) Date of Patent: *May 15, 2018

(54) HYDROTHERMAL CONVERSION PROCESS WITH INERTIAL CAVITATION

(71) Applicant: Alireza Shekarriz, Rio Rancho, NM (US)

(72) Inventor: Alireza Shekarriz, Rio Rancho, NM (US)

(*) Notice: Subject to any disclaimer, the term of this patent is extended or adjusted under 35 U.S.C. 154(b) by 47 days.

This patent is subject to a terminal disclaimer.

(21) Appl. No.: 15/177,654

(22) Filed: Jun. 9, 2016

(65) Prior Publication Data

US 2016/0361700 A1    Dec. 15, 2016

Related U.S. Application Data

(60) Provisional application No. 62/173,804, filed on Jun. 10, 2015.

(51) Int. Cl.
| | | |
|---|---|---|
| C01B 31/02 | (2006.01) | |
| B01J 19/00 | (2006.01) | |
| C05F 11/00 | (2006.01) | |
| C10L 5/44  | (2006.01) | |
| C10L 9/08  | (2006.01) | |
| C01B 32/05 | (2017.01) | |

(52) U.S. Cl.
CPC ............ *B01J 19/008* (2013.01); *C01B 32/05* (2017.08); *C05F 11/00* (2013.01); *C10L 5/447* (2013.01); *C10L 9/086* (2013.01); *C10L 2200/0469* (2013.01); *C10L 2250/06* (2013.01); *C10L 2290/06* (2013.01); *C10L 2290/148* (2013.01); *Y02E 50/30* (2013.01)

(58) Field of Classification Search
CPC ...................................................... C01B 32/05
See application file for complete search history.

(56) References Cited

U.S. PATENT DOCUMENTS

| | | |
|---|---|---|
| 5,370,999 A     | 12/1994 | Stuart |
| 6,635,178 B2    | 10/2003 | Bowman |
| 7,727,355 B2    | 6/2010  | Goto |
| 8,481,642 B2    | 7/2013  | Antonietti |
| 8,513,004 B2    | 8/2013  | Heathcote |
| 8,603,789 B2    | 12/2013 | Harlick |
| 9,695,093 B2 *  | 7/2017  | Shekarriz ............... C05F 17/00 |
| 2005/0067122 A1 | 3/2005  | Kazem |
| 2008/0006518 A1 | 1/2008  | Shimojo |
| 2011/0056125 A1 | 3/2011  | Antonietti |
| 2012/0000120 A1 | 1/2012  | Stark |
| 2012/0110896 A1 | 5/2012  | Coronella |
| 2015/0361372 A1 | 12/2015 | Shekarriz |

FOREIGN PATENT DOCUMENTS

WO    2012/095408 A    7/2012

OTHER PUBLICATIONS

Kruse, Current Opinion in Chemical Biology 2013, 17:515-521.
Ocfemia, Transactions of the ASABE, vol. 49(2):533-541 (2006).

* cited by examiner

*Primary Examiner* — Stuart Hendrickson

(57) ABSTRACT

Hydrothermal conversion is performed on organic feedstocks that include solids, by forming a slurry of the feedstock in water and subjecting the slurry to hydrothermal conversion conditions. The hydrothermal conversion conditions may be sufficient to product a carbonized solid and/or liquefaction products. The size of solids (either or both of feedstock or carbonized solids produced in the process) is reduced by conducting a series of bubble-forming and bubble-collapsing cycles on the slurry.

21 Claims, 1 Drawing Sheet

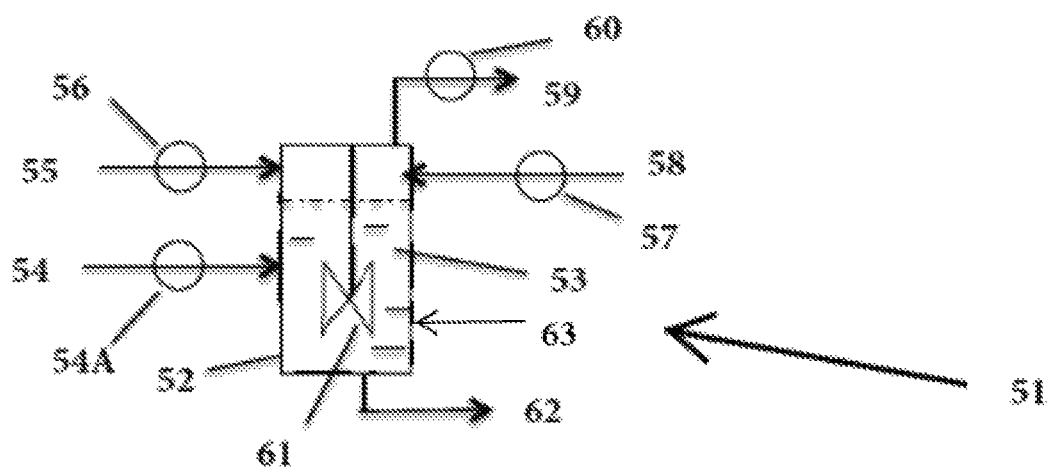

HYDROTHERMAL CONVERSION PROCESS WITH INERTIAL CAVITATION

This invention relates to a hydrothermal conversion process for converting organic matter to one or more hydrothermal conversion products.

Hydrothermal conversion is a method by which an organic feedstock is reacted with water under conditions of high temperature and pressure. Depending on conditions, the reaction products include carbonized solids, oily liquids, low molecular weight room temperature liquids or gases. The hydrothermal conversion products are useful as fuels, fertilizers, chemical feedstocks and in other potential applications.

The feedstocks that go into hydrothermal conversion processes typically include or consist of solids. A typical organic feedstock is or includes one or more biological waste products such as plant waste products, animal (including human) waste products, agricultural and slaughterhouse wastes, food wastes and other industrial and materials processing wastes that have little if any economical value in their existing form.

To process solid feedstocks efficiently and obtain a uniform and predictable product, it is necessary to provide them in the form of small particles. Unfortunately, the waste materials used as feedstocks seldom are obtained in a conveniently formatted particle size distribution. Plant wastes, for example, may consist of stalks, branches, leaves, stripped bark or large chips. In these cases, it is necessary to reduce these to a particulate form before they can be processed through the hydrothermal liquefaction process. The problem is exacerbated in many cases because organic materials such as plant wastes often are tough, non-friable materials that are difficult to grind. Therefore, the size reduction steps add very substantial equipment and operating costs to the process, and severely reduce its overall economic viability.

It would be desirable to provide a hydrothermal conversion process that can tolerate larger organic feedstock materials, and which can efficiently convert such larger feedstock materials to hydrothermal conversion products.

This invention is a hydrothermal conversion process comprising the steps of a) combining a particulate solid organic feedstock with water to form a slurry of the organic feedstock particles in a liquid phase;

b) subjecting the slurry to hydrothermal conversion conditions including a temperature of at least 160° C. and a superatmospheric pressure sufficient to maintain at least a portion of the water as a subcooled liquid, to convert at least a portion of the organic feedstock to one or more hydrothermal conversion products, wherein prior to, during and/or after step b), and at such a time as particles of the organic feedstock and/or a solid hydrothermal conversion product are dispersed in the liquid phase, the liquid phase with the dispersed particles is cycled through one or more bubble-forming and bubble-collapsing cycles while maintaining a liquid phase temperature of at least 100° C., wherein each bubble-forming and bubble-collapsing cycle includes the steps of i) forming gas bubbles in the slurry and then ii) subjecting the gas bubbles to pressure and temperature conditions sufficient to condense gas in the gas bubbles and collapse the bubbles.

Performing one or more bubble-forming and bubble-collapsing cycles is believed to create an effect known as inertial cavitation. The collapse of the bubbles in particular is accompanied by a large localized release in energy. It is believed that this release of energy creates localized turbulence and/or a shock wave. The turbulence and/or shock wave supplies energy to the region immediately surrounding a collapsed bubble. This energy in some cases breaks dispersed particles and thereby reduces their size. The released energy can also break up agglomerates, aggregates or clusters of particles. In cases in which the bubble-forming and bubble-collapsing cycles are performed under hydrothermal conversion conditions, the released energy causes localized turbulence which can improve localized mixing and thereby enhance reaction rates, thereby speeding the hydrothermal conversion process and/or driving more complete conversion of starting material to one or more hydrothermal conversion products.

Because the particle size of the dispersed particles can become reduced, the process is relatively tolerant of large particle size feedstocks; therefore it is not necessary to provide an initial feedstock in which the solid particles are finely divided. Instead, coarse particles can be used as the feedstock in this process. Furthermore, no external mechanical power and hardware would be required, as it would be in, e.g., grinding operations, to achieve reduction in size.

The particles dispersed in the liquid phase during the bubble-forming and bubble-collapsing cycles can include one or more of feedstock particles and/or solid particles of one or more hydrothermal conversion products. The particles of hydrothermal conversation products may be fully- or partially-carbonized particles formed in the hydrothermal conversion step b). The carbonized material is often quite friable, relative to the feedstock, and so the step of reducing its size can be accomplished quickly and inexpensively using this method. In some cases, the dispersed particles includes larger particles of the feedstock that may not be fully carbonized. Such partially carbonized particles may have carbonized exterior portions, and interior portions that have not carbonized or only partially carbonized. In such cases, the carbonized surfaces of those larger particles can be stripped off during the size reduction process. This exposes the underlying surface of the uncarbonized or partially carbonized portion to the liquid phase, which facilitates further conversion to one or more hydrothermal conversion products.

In some embodiments, the hydrothermal conversion, bubble-forming and bubble-collapsing steps are all performed in simplified equipment, which leads to substantial savings in capital investment and operating costs. In particular, it is not necessary to provide specialized mechanical grinding equipment.

BRIEF DESCRIPTION OF THE DRAWING

The FIGURE is a schematic diagram of apparatus for carrying out an embodiment of the invention.

The organic feedstock used in this invention includes one or more organic materials that are solid at the temperature of the process. The solid (prior to conversion) organic material(s) preferably are not soluble in water at the process temperature. The organic feedstock may contain, in addition to the solids, one or more organic materials that have melting temperatures below the process temperature and/or which are soluble in water at the process temperature.

The feedstock includes one or more solid organic compounds having at least one C—H bond, and more typically also includes at least one carbon-oxygen bond and/or at least one carbon-nitrogen bond. The organic compounds may contain other types of bonds, such as (without limitation) one or more carbon-halogen bonds, one or more carbonphosphorus bonds, one or more carbon-sulfur bonds, one or more oxygen-hydrogen bonds, one or more nitrogen-hydrogen bonds, as well as others. The solid organic feedstock preferably has an oxygen:carbon atomic ratio of at least 0.5 and a hydrogen:carbon atomic ratio of at least 1.5, preferably at least 1.75.

Some or all of the organic compounds may be of biological origin i.e., one or more materials produced by biological processes. All or some of the organic materials may have been pretreated thermally (e.g., by autoclaving), thermochemically (e.g., by aerobic or anaerobic digestion), mechanically (e.g., by dry grinding, wet grinding, sorting, filtration, etc.), or chemically (e.g., by flocculation). Organic materials of biological origin include plant tissues, i.e., whole plants as well as parts of plants such as stems, leaves, seeds, seed pods or other fruit, flowers and roots; and cellulosic or lignocellulosic plant products such as cellulose, cotton, linen, other plant fibers, wood, and the like. Such plant tissues may include, for example, various stover products (where "stover" refers to plant residue of annual plants that remains after harvest or otherwise at the end of the growing season), straw, hay, leaves, branches, trunks and/or roots of trees, and the like. The plant matter may include plant products such as paper, rope and other fibrous products, cardboard, wood, wood particles (including sawdust) and other waste from sawmill operations, waste wood and waste wood products, or other lignocellulosic material of plant origin.

Another type of organic material of biological origin is animal tissue such as animal cadavers and animal parts such as muscles, skin, hair, internal organs, connective tissue and the like. Animal tissues also include animal products such as, for example, leather, hair, wool and the like.

Other types of organic material or biological origin include microbial biomass such as bacteria, yeast, algae and other microbes, which may be living or dead.

Yet other types of organic material of biological origin include animal feces (which may include human feces), which feces may have been previously treated through a pretreatment process such as a digestion, composting, autoclaving, or fermentation process. Feces (whether pretreated or not) typically contains microbial material, which typically includes bacteria or other microbes such as are present in the gut of the animal that produced the feces. The microbial material may include microbes that are added to the fecal matter in a pretreatment step, such as in an aerobic or anaerobic digestion or fermentation pretreatment. The microbial material may include live cells, dead cells or both. Feces also typically includes undigested plant or animal tissue (such as fiber), fat, and/or protein in addition to the microbial material.

The organic feedstock may include a sludge produced in the microbial digestion of fecal matter (optionally together with other organic feedstocks such as garbage and/or plant or animal tissues) by microbial action. The organic matter may be a blend of this sludge and one or more other types organic matter.

Organic matter of biological origin can take the form of wastes from various processing operations, such as wastes from agricultural harvesting and processing, slaughterhouse, butchery or other meat-processing wastes; household and other garbage and/or rubbish; wastes from food-processing operations (for human and/or animal consumption, or in the production of fertilizers), wastes from restaurants or groceries, and the like.

In addition to the foregoing feedstock materials, industrial wastes and byproducts and recovered materials including various types of polymeric materials are useful. For example, polymeric scrap or trim from various types of thermoplastic and/or thermosetting polymer processing operations can be used, as well as recycled post-industrial or post-consumer thermoplastic and/or thermoset polymers.

An advantage of the invention is that the solid feedstock does not need to be finely divided before the start of the process. It is generally sufficient to size the feedstock so it fits in the processing equipment and can be processed in or through it. The feedstock may, for example, contain individual pieces or particles that have volumes of 1 mL or larger, which are difficult to process efficiently in a conventional hydrothermal conversion process. The feedstock may contain individual pieces or particles that have volumes of at least 2 mL, at least 5 mL, at least 10 mL, at least 25 mL, at least 50 mL or at least 100 mL. The upper limit on the size of the individual pieces is limited only by the ability to handle them in the particular processing equipment. Pieces of the aforementioned sizes may constitute, for example, at least 1%, at least 2%, at least 5%, at least 10%, at least 25%, or at least 50% of the total weight of the solid organic feedstock.

The organic feedstock is combined with water to form a slurry, and the slurry is subjected to hydrothermal conversion conditions. The hydrothermal conversion conditions are sufficient to convert at least a portion of the organic feedstock to a hydrothermal conversion product, which may be, for example, a carbonized solid (in a hydrothermal carbonization process) or one or more liquid organic compounds (in a hydrothermal liquefaction process), or one or more gaseous oxidation products (in a wet-air oxidation process). The hydrothermal conversion conditions in each of these cases include a temperature of at least 160° C. and a superatmospheric pressure sufficient to maintain the water as a subcooled liquid, i.e., a pressure above the saturation pressure of water at the operating temperature. In the case of a wet-air oxidation process, the hydrothermal conditions also include the presence of an additional oxidant such as molecular oxygen or a peroxide compound such as hydrogen peroxide.

The solids content of the starting slurry can vary widely from, for example, a solids content as low as 0.1% by weight, to as high as 30% by weight. Preferred solids contents are 1 to 10%, 1 to 8% or 1 to 5% by weight.

The aqueous phase of the starting slurry includes water, which may have various materials dissolved therein. The dissolved materials may include, for example, inorganic salts, water-soluble organic materials including water-soluble biological materials such as proteins, sugars, saccharide oligomers, and the like; surfactants and/or flocculants; and the like. These may be, for example, brought in with the feedstock or may result from dissolution and/or reaction of the feedstock. Preferably, undissolved material other than the organic feedstock (i.e., which does not form part of the organic feedstock) constitutes no more than 5%, more preferably no more than 1% of the weight of the starting slurry. Water preferably constitutes at least 35%, more preferably at least 50%, of the total weight of the slurry at the start of the hydrothermal conversion reaction.

The reaction mixture as described above is brought to a temperature of at least 160° C. and sufficient pressure to maintain water as a subcooled liquid, and maintained under those conditions for a period of time sufficient to convert at least a portion of the feedstock to one or more hydrothermal conversion products. In general, the conditions, particularly pressure but often temperature as well, for producing a carbonized solid product are less severe than those needed to obtain liquefaction products. Wet-air oxidation further requires the presence of an oxidant, as mentioned above.

For forming a carbonized product, the temperature may be, for example, 160° C. to as much as 300° C. and more preferably is no more than 250° C. The pressure may be up to 8 MPa, more preferably 0.62 to 8 MPa and still more preferably 1 to 7 MPa.

For liquefaction, the temperature may be as low as 160° C. but preferably is at least 200° C. and may be at least 250° C. The temperature may be as high as 400° C., and preferably is up to 375° C. The pressure conditions are in general above the saturation pressure of water at the temperature of the liquefaction step. The pressure in the liquefaction step typically is at least 4 MPa and more typically at least 8 MPa. The pressure may be as high as 30 MPa, but preferably is no higher than 20 MPa.

For wet-air oxidation, the temperature may be, for example, 160° C. to as much as 400° C. The pressure conditions are in general above the saturation pressure of water at the temperature of the wet-air oxidation step, and may be, for example, at least 4 MPa and more typically at least 8 MPa, up to 30 MPa or up to 20 MPa.

The time required to perform the hydrothermal conversion may vary quite substantially depending on many factors such as the starting solids content, the size of the feedstock solids, the temperature and pressure, whether hydrothermal carbonization, liquefaction or wet-air oxidation is performed, and the particular equipment used. The required time may be, for example, as short as about 1 minute or as long as several hours. In some specific embodiments, the required time is at least 5 minutes or at least 10 minutes but not more than 5 hours or not more than one hour.

The hydrothermal conversion reactions are typically exothermic. Therefore, once reaction conditions are achieved, it is in most cases not necessary to apply additional heat to maintain the reaction temperature and to the contrary may be necessary to apply cooling to remove exothermic heat from the reaction mixture. Exothermic heat can be captured and used in other useful ways. As an example, this recovered heat may be captured in a counterflow heat exchanger, where the high pressure and high temperature side are the reactor lines, to convert water flowing at lower pressures to steam, and the steam generated in this process could be used to produce mechanical power or to drive a steam generator to produce electric power.

The equipment used to perform the hydrothermal conversion is not critical, so long as it can tolerate the necessary temperatures and pressures. Batch, semi-batch, semi-continuous or continuous equipment can be used depending in part on the physical form (including particle size) of the feedstock.

In addition, methods and equipment for performing hydrothermal conversion of an organic feedstock such as described in, for example, Kruse et al., *Current Opinion in Chemical Biology* 2013, 17:515-521; US Published Patent Application No. 2008-0006518; US Published Patent Application No. 2012-0000120; WO2012/095408; US Published Patent Application No. 2012-0110896 and Zhang in Chapter 10 (pp. 201-232) of *Biofuels from Agricultural Wastes and Byproducts*, Hans P. Blaschek et al., eds., Blackwell Publishing 2010 are suitable for performing the hydrothermal conversion.

The hydrothermal conversion step may be performed using a method as described in US Published Patent Application No. 2015-0361372 (incorporated herein by reference). In such a process, the aqueous feedstock slurry is mixed under elevated pressure with a steam stream under conditions such that upon mixing all or a portion of the steam condenses and a reaction mixture having a temperature of at least 160° C. is formed at a pressure such that water including the condensed steam remains as a subcooled liquid. The reaction mixture is maintained at a temperature of at least 160° C. and at a pressure sufficient to maintain water including the condensed steam as a subcooled liquid for a period of time sufficient to produce the hydrothermal conversion product. The pressure is then relieved to convert at least a portion of the liquid water to gas, and one or more hydrothermal conversion products are recovered.

A carbonized product producing in some embodiments of the invention is characterized by having an oxygen:carbon atomic ratio of <0.4, <0.3, <0.2, <0.1 or <0.05, a nitrogen:carbon atomic ratio of <0.2, <0.1, <0.05 or <0.025, and/or a hydrogen:carbon atomic ratio of <1.5, <1.2, <1.0 or <0.8. Liquefaction products are carbon-containing compounds that are liquid at room temperature and one atmosphere pressure. These include various oily compounds that may have molecular weights, for example, from 350 to 3000, especially 500 to 1500, as well as various liquid organic compounds having molecular weights of about 60 to about 350, including, for example, hydrocarbons, alkanols, liquid phenolic compounds, phenolic ethers, benzoic acid and derivatives, liquid furanes, liquid furfurals, and polyfuranes, liquid aldehydes, liquid esters, liquid amine compounds, liquid pyroles, liquid pyridines, and the like. Liquefaction products may be characterized by having an oxygen:carbon atomic ratio of <0.8, <0.6, <0.4, <0.2 or <0.1, a nitrogen:carbon atomic ratio of <0.5, <0.25 or <0.1, and/or a hydrogen:carbon atomic ratio of <1.5, <1.0 or <0.8. Liquefaction products may eventually be used as fuels (such as biodiesel), as renewal solvents or (entirely or partially) as raw materials for manufacturing various chemical compounds.

The hydrothermal carbonization and hydrothermal liquefaction reactions may also produce one or more reaction products that are gases at room temperature and atmospheric pressure, such as carbon dioxide, nitrogen, $NO_x$ compounds, carbon monoxide, methane and water.

Wet-air oxidation processes produce mainly highly oxidized reaction products such as carbon dioxide, carbon monoxide, water and $NO_x$ compounds.

In the bubble-forming and bubble-collapsing steps, small voids or bubbles are formed in the liquid phase and then caused to collapse. Conditions during the bubble-forming and bubble-collapsing steps include a liquid phase temperature of at least 100° C. and the presence of particles dispersed in the liquid phase. As discussed more thoroughly below, the dispersed particles may be particles of the organic feedstock and/or a solid hydrothermal conversion product, especially a partially- or entirely-carbonized hydrothermal carbonization product.

The liquid phase temperature during the bubble-forming and bubble-collapsing cycles may be at least 160° C. to as high as 400° C. The pressure preferably is superatmospheric pressure, and may be, for example, at least 0.62 MPa up to 30 MPa.

The voids or bubbles can be produced mechanically by the operation of a rapidly spinning rotor. The rotor produces localized voids that collapse as they become transported away from the immediate vicinity of the rotor.

In another bubble-forming and bubble-collapsing process, each bubble-forming and bubble-collapsing cycle includes the steps of i) adjusting the pressure and/or temperature such that a portion of the liquid phase, preferably a portion of the water, volatilizes to form bubbles and then ii) re-adjusting the pressure and/or temperature to recondense the gas in the bubbles and collapse the bubbles. In such a method, the slurry is subjected to conditions are such that at least a portion of the liquid phase (preferably a portion of the water in the liquid phase) is subcooled. The temperature may be slightly below (such as within 20° C., preferably within 10° C. and more preferably within 5° C.) of the boiling temperature of the subcooled liquid at the process pressure. The subcooled liquid is then brought to pressure and temperature conditions such that at least a portion of it volatilizes to form bubbles in the liquid phase. The solids may function as bubble nucleation sites. The volatilization can be effected by i) decreasing the pressure, ii) increasing the temperature, or iii) some combination of reducing pressure and increasing temperature. Reducing the pressure has the advantages of requiring minimal if any thermal energy input and of allowing very rapid transition from subcooled to boiling conditions. By manipulating pressure, bubble formation often can be achieved in less than one minute, or even less than 10 seconds, or in some instances in less than 1 second or even less than 0.1 second. Once bubbles are formed, they are collapsed by again adjusting the pressure and/or temperature conditions to subcooled conditions. This can be performed by i) increasing the pressure, ii) decreasing the temperature, or iii) some combination of increasing pressure and decreasing temperature. As before, changing the pressure is particularly advantageous, as bubble collapse can be achieved, for example, in less than one minute or even less than 10 seconds, or in some instances in less than 1 second or even less than 0.1 second. This allows rapid cycling between bubble formation and bubble collapse.

The gas in the bubbles may wholly or partially consist of water that volatilizes during the bubble-forming step. Often, the process liquor formed during the hydrothermal conversion step includes one or more liquid organic compounds that are more volatile than water. These may be present in the original feedstock and/or formed during the hydrothermal conversion step. The gas in the bubbles that form during the cavitation-induced size reduction step in such cases may wholly or partially consist of one or more such organic compounds.

In an especially preferred cavitation-induced size reduction step process, the liquid phase with dispersed particles is brought to a temperature above 100° C., preferably at least 160° C., more preferably 160 to 350° C. The pressure is sufficiently above the saturation pressure of at least one component of the liquid phase at the given temperature, such that that component is maintained as a subcooled liquid. Preferably, the pressure is above the saturation pressure of water at the given temperature, such that water is maintained as a subcooled liquid. As before, these pressure conditions already exist during the hydrothermal conversion steps, so when the bubble-forming and collapsing cycles are performed during a hydrothermal conversion step, no pressure adjustment is needed to bring the slurry to the necessary conditions for beginning the size reduction process.

The saturation pressure is the minimum pressure needed to force a gas into the liquid (subcooled) state at a given temperature. The saturation pressure for a substance can be determined empirically. For many substances, these pressures are reported in the literature. In the case of water, the saturation pressures are particularly well-known, and are reported, for example, Table 3, "Compressed Water and Superheated Steam" published by National Institute of Standards and Technology (NIST) and found at http://www.nist.gov/srd/upload/NISTIR5078-Tab3.pdf. Saturation pressures for water at various temperatures can be generated using the Engineering Equation Solver (EES) software developed by S. A. Klein and F. L. Alvarado. This software incorporates the Steam IAPWS routine, which in turn incorporates the 1995 Formulation for the Thermodynamic Properties of Ordinary Water Substance for General and Scientific Use, issued by The International Association for the Properties of Water and Steam (IAPWS). The saturation pressures for water at various exemplary temperatures are:

160° C.-618.28 kPa
200° C.-1554.9 kPa
250° C.-3976.2 kPa
300° C.-8587.9 kPa
350° C.-16.529 MPa

In this especially preferred cavitation-induced size reduction process, bubbles are then formed by reducing the pressure to below the saturation pressure of at least one subcooled component of the liquid, preferably to below the saturation pressure of water, at the operating temperature. The pressure may be reduced to, for example 50 to 99%, preferably 75 to 95% of the saturation pressure. It is not necessary to change the temperature, although small changes in temperature may be produced as a result of the pressure drop, and as a result of the vaporization of a portion of the liquid to form bubbles. If the temperature is reduced, the pressure drop is to a value below the saturation pressure at the reduced pressure. Bubbles form with the drop in pressure. It is believed that solid particles in the slurry function as bubble nucleation sites.

Once bubbles have formed, the pressure is again increased to above the saturation pressure of at least one of the components of the liquid phase, preferably water, that has volatilized to form the bubbles. The pressure may be increased to, for example, 100 to 200% of the saturation pressure, preferably 100 to 125% thereof. Again, it is not necessary to adjust the temperature, although the increase in pressure may induce a small temperature increase. The latent heat of vaporization released when the bubbles collapse may contribute to a small temperature rise. Furthermore, the conditions in preferred embodiments are sufficient for hydrothermal carbonization and/or liquefaction to take place; as those reactions are exothermic, the exothermic heat of reaction also may result in a small temperature increase. During the bubble-forming and bubble-collapsing steps, heat may be removed or added to maintain a nearly constant temperature (such as for example, to maintain the temperature within a range of ±20° C. or less, or of ±10° C. or less) in the liquid phase.

In this especially preferred process, the bubble-forming and collapsing steps can be repeated as just described, by sequentially reducing the pressure and then increasing the pressure to below and above the saturation pressure of at least one subcooled component of the liquid phase, and in particular to below and above the saturation pressure of water, at the process temperature.

Pressure cycling to induce bubble formation and collapse can be accomplished through a variety of means, for example by use of a reciprocating piston, a resonating piezoelectric module, a rapidly opening and closing solenoid valve placed at any point in the system, or through the use of a reciprocating feedstock pump. These all can be used to impart compression and expansion waves, achieved through system mass and/or volume fluctuations, into a slurry which is at saturation or near saturation (boiling) conditions. For example, suitable apparatus may include a constant pressure source using a nitrogen tank and a regulator to provide pressurized gas at the needed pressures, a pressure sensor that monitors the system pressure, a control unit that interprets the system pressure signal and provides an ON/OFF signal to a high pressure solenoid bleed valve, and a solenoid bleed valve placed along the nitrogen feed line that purges some of the nitrogen to produce a pressure drop. Controlled, pulsed opening of the valve results in sufficiently large system pressure drop to induce bubble formation within the slurry, most likely as bubbles or microbubbles attached to the particles in the slurry or carbonized surfaces (i.e., heterogeneous nucleation sites). Closing the valve results in a pressure increase that collapses the bubbles.

The bubble-forming step can be performed by injecting steam into the dispersion of particles into the liquid phase. The steam injection may be performed during a heating cycle of the hydrothermal conversional step(s). In this approach, steam is injected into the slurry, such as through one or several small orifice(s) or through a perforated pipe over which the slurry flows, or through orifice(s) in a series of perforated pipes located within the liquid phase in a reactor, thereby causing intimate contact between the slurry and the pressurized steam. The steam is at a higher temperature than the liquid phase of the slurry. In this case, the steam entering the solution forms the bubbles prior to bubble-collapsing step. The temperature and pressure conditions are sufficient to subcool water. Upon contacting the steam with the slurry under such conditions, the steam bubbles cool and collapse to impart energy into the surrounding liquid. In a wet-air oxidation process, steam can be injected together with an oxidation gas.

In another but less preferred approach, a jet of pressurized hot water is injected at high velocity into a preheated slurry at hydrothermal carbonization or liquefaction conditions such that bubble formation and collapse takes place within the jet.

The number of bubble-forming and bubble-collapsing cycles may be as few as one, or any arbitrarily larger number as may be needed, such as at least 10, at least 25, at least 100 or at least 1,000. For example, up to 10,000,000, up to 1,000,000, up to 100,000, up to 25,000, up to 10,000, up to 1,000, up to 100, up to 25 or up to 10 bubble-forming and bubble-collapsing cycles can be performed. The cycle time, expressed as number of bubble-forming and bubble-collapsing cycles per unit time, may range for example from 0.01 to 100,000 cycles per second.

The step of bubble formation and collapsing can be performed before, during, and/or after the hydrothermal conversion step(s).

If performed before any hydrothermal conversion step, the main benefit of the bubble formation and collapsing cycling is to reduce the size of the feedstock particles and/or break up agglomerates. Preferably, the size of the feedstock particles is reduced so that particles having surface areas of 3.2 $cm^2$ or less (which corresponds to spherical particles approximately 1 cm in diameter) are produced. More preferably, the particle size is reduced so that particles that have surface areas of 0.03 $cm^2$ or less (which corresponds to spherical particles approximately 1 mm in diameter) are produced. Significantly smaller particles, such as those having surface areas of, for example, 0.01 $cm^2$ or less, 0.001 $cm^2$ or less, 0.0001 $cm^2$ or less, and as small as, for example, 0.00000001 $cm^2$, may be produced.

The ability to easily produce very fine particles of the organic feedstock and/or partially- or wholly carbonized material is a major engineering benefit of this invention, as it permits the use of readily available and inexpensive pressure regulators to maintain the needed operating pressures in a continuous flow system. An additional benefit of the size reduction is linked to pressure control in the system. Pressure regulators and valves are often fouled in flow of high-pressure biomass slurry because the particles are close to or larger than the size of flow restriction orifice (~0.1-0.2 mm) used to contain the pressure in the system. This represents a significant technological barrier. Thus, successful implementation of a size reduction approach greatly improves operability and cost for high throughput systems.

Particularly when bubble formation is performed by steam injection as described above, the bubble formation and collapsing steps may be performed simultaneously with a heating step in which the feedstock particles and liquid phase are heated to the hydrothermal conversion temperature, or in which carbonized particles from a first hydrothermal carbonization step are heated along with the liquid phase to hydrothermal liquefaction or wet-air oxidation conditions. In such cases, the injected steam is used to both form the bubbles and heat the slurry.

When the hydrothermal conversion includes a hydrothermal carbonization step, the bubble-forming and bubble-collapsing steps in specific embodiments are performed:

a. Before carbonized solids are formed, to reduce the size of at least some of the feedstock particles;

b. Simultaneously with some or all of the hydrothermal carbonization step. In such embodiments, the bubble formation and collapse can reduce the size of at least some of the organic feedstock solids, and/or at least some of the carbonized and/or partially carbonized solids as they are formed, and may enhance reaction rates due to localized mixing and the reduction in particle size; or c. After the hydrothermal conversion step, to reduce the size of the carbonized and/or partially carbonized solids formed in the process.

Combinations of any two or more of embodiments a, b and c can be implemented. For example, bubble-forming and bubble-collapsing steps can be performed prior to performing hydrothermal conversion, to reduce the feedstock solids size, and then be performed again after the hydrothermal conversion step is completed, to reduce the size of the carbonized solids. Reductions of particle sizes as described above can take place when any of embodiments a, b or c is performed.

Alternatively, a portion of the hydrothermal carbonization step can be performed, followed by bubble-forming and bubble-collapsing steps to break up larger particles of feedstock and/or larger particles of carbonized product, as well as to strip a carbonized exterior from partially carbonized particles. The smaller particles thus produced are more easily converted due to their higher surface area. The smaller particles are then subjected to hydrothermal conversion conditions to produce more carbonized product.

When hydrothermal liquefaction and/or wet-air oxidation is performed, the bubble-forming and bubble-collapsing steps are performed primarily to reduce the particle size of the organic feedstock solids to facilitate faster and/or more complete conversion, and/or to enhance reaction rates due to localized mixing. Thus, those steps are in general performed before and/or during the hydrothermal liquefaction or wet-air oxidation step, while particulate matter is still present.

In some embodiments, the hydrothermal conversion step includes a first hydrothermal carbonization step to produce wholly- or partially-carbonized solid particles, a step of reducing the particle size of the wholly- or partially-carbonized solid particles by performing the bubble-forming and bubble-collapsing steps, and a further hydrothermal conversion step. The further hydrothermal conversion step may be a second hydrothermal carbonization step, a thermal liquefaction step and/or a wet-air oxidation step. In these embodiments, the bubble-forming and bubble-collapsing steps can be performed simultaneously with and/or after the first hydrothermal carbonization step. If performed after the first hydrothermal carbonization step, the step of bubble-forming and collapsing can be performed as an intermediate step between the first hydrothermal carbonization step and the further hydrothermal conversion steps, and/or be performed simultaneously with a further hydrothermal conversion step. In a process as described in this paragraph, the reaction mixture preferably is not cooled below 160° C. between the hydrothermal conversion steps, even if a bubble-forming and collapsing step is performed as a separate intermediate step. More preferably, at least a portion of the water is continuously maintained as a subcooled liquid from the start of the first hydrothermal carbonizations step to the end of the last hydrothermal conversion step, including during any intermediate bubble-forming and bubble-collapsing steps.

An advantage of this embodiment is that the carbonized product of the first hydrothermal conversion step is friable. Therefore the energy requirements to reduce the size of the solids are low compared to those of the starting organic feedstock. Therefore, size reduction after the first hydrothermal carbonization step is accomplished much more easily, at generally lower cost, than doing so to the starting organic feedstock. In addition, very small particle sizes are significantly easier to obtain on the carbonized material produced in the first hydrothermal carbonization step.

Similarly, hydrothermal liquefaction and/or wet-air oxidation can be performed in multiple stages, with the bubble-forming and collapsing steps being performed during any or all of those stages (as long as solid particles are present), or as one or more separate steps intermediate to any of those stages. As before, it is preferred to continuously maintain at least a portion of the water as a subcooled liquid from the start of the first hydrothermal conversion step to the end of the last hydrothermal conversion step, including any intermediate bubble-forming and bubble-collapsing steps. It is especially preferred to continuously maintain hydrothermal conditions from the start of the first hydrothermal conversion step to the end of the last hydrothermal conversion step, including any intermediate bubble-forming and bubble-collapsing steps.

With suitably designed apparatus, the hydrothermal conversion and bubble formation/collapsing steps can be performed in the same apparatus. Such an apparatus is capable of withstanding the temperatures and pressures of the hydrothermal conversion step(s), and in addition be adapted for performing the bubble formation and collapse, as described before. A schematic of a suitable apparatus is shown in the FIGURE.

The apparatus shown in the FIGURE is a simplified apparatus 51 that includes a single vessel 52 in which the hydrothermal conversion and bubble formation/collapsing steps are performed. Organic feedstock is introduced through line 54. The organic feedstock may be formed into a slurry before being introduced into vessel 52.

As shown in FIG. 2, steam is introduced into vessel 52 through line 55. This is an optional but preferred feature, which allows slurry 53 to be heated by steam provided through line 55. In the embodiment shown, a pressurizing gas is provided to vessel 52 through line 58. If steam is to be fed into vessel 52 through line 55, it may be unnecessary to provide pressurizing gas through line 58. Line 59 provides a means for removing gas from the inside of vessel 52.

Pressure within vessel 52 can be controlled by pressurizing the interior of vessel 52 with steam provided through line 55, by pressurizing the interior of first vessel 52 with a pressurizing gas provided by line 58, by removing gas through outlet line 59, or by other equivalent means such as those described below. As shown, each of lines 55, 58 and 59 are equipped with optional pressure regulators 54A, 56, 57 and 60 for controlling pressure to the desired level.

Heating and/or cooling can be provided by jacketing vessel 52, or by providing internal heating and/or cooling elements. Slurry 53 can be heated within vessel 52, and/or can be partially or fully heated before being charged to vessel 52. In certain embodiments, slurry 53 is heated to a temperature of up to 100° C. and then combined with steam provided through line 55 under pressure conditions such that at least some of the steam condenses to form subcooled water. In this way, the enthalpy of condensation goes to increase the temperature of the slurry. Also, steam bubbles formation and collapse can occur. This step of mixing a preheated slurry with steam can alternatively be performed outside of vessel 52, and the heated, pressurized slurry so formed then transferred to vessel 52.

In the embodiment shown, vessel 52 is equipped with agitation means 61, as before. A product outlet such as outlet line 62 can be provided to remove liquid and/or solid reaction products from vessel 52. An optional oxidizing gas and/or steam for producing bubbles may be introduced through line 63.

To perform the hydrothermal conversion step, hydrothermal conversion conditions including temperature and pressure conditions as described above, are established in vessel 52, and maintained for a time sufficient to convert the feedstock to the desired hydrothermal conversion product(s).

Bubbles are formed and then collapsed, preferably by fluctuating the pressure within vessel 52, for example through feeding and/or removing gas through any of lines 55, 58 and 59, or equivalent means.

What is claimed is:

1. A hydrothermal conversion process comprising the steps of
   a) combining a particulate solid organic feedstock with water to form a slurry of the organic feedstock particles in a liquid phase;
   b) subjecting the slurry to hydrothermal conversion conditions including a temperature of at least 160° C. and a superatmospheric pressure sufficient to maintain at least a portion of the water as a liquid, to convert at least a portion of the organic feedstock to one or more hydrothermal conversion products
   wherein prior to, during and/or after step b), and at such a time as particles of the organic feedstock and/or a solid hydrothermal conversion product are dispersed in the liquid phase, the liquid phase with the dispersed particles is cycled through one or more bubble-forming and bubble-collapsing cycles while maintaining a liquid phase temperature of at least 100° C., wherein each bubble-forming and bubble-collapsing cycle includes the steps of i) forming gas bubbles in the slurry and then ii) subjecting the gas bubbles to pressure and temperature conditions sufficient to condense gas in the gas bubbles and collapse the bubbles.

2. The process of claim 1, wherein each bubble-forming and bubble-collapsing cycle includes the steps of i) adjusting the pressure and/or temperature of the intermediate slurry such that a portion of the liquid phase volatilizes to form bubbles and then ii) re-adjusting the pressure and/or temperature to condense the volatilized liquid phase within the bubbles and collapse the bubbles.

3. The process of claim 1 wherein each bubble-forming and bubble-collapsing cycle includes the steps of establishing an operating temperature of at least 160° C. and a pressure above the saturation pressure of at least one compound at the operating temperature, forming bubbles that include the at least one compound by reducing the pressure to below the saturation pressure of the at least one compound at the operating temperature such that a portion of the at least one compound volatilizes, and collapsing the bubbles by then increasing the pressure to above the saturation pressure of the at least one compound.

4. The process of claim 1 wherein each bubble-forming and bubble-collapsing cycle includes the steps of establishing an operating temperature of at least 160° C. and a pressure above the saturation pressure of water at the operating temperature, forming bubbles that include water by reducing the pressure to below the saturation pressure of water at the operating temperature such that a portion of the water volatilizes, and collapsing the bubbles by then increasing the pressure to above the saturation pressure of water.

5. The process of claim 1 wherein the bubble-forming and bubble-collapsing cycle includes a step of injecting steam into the liquid phase above the saturation pressure of water at the temperature of the liquid phase, such that the steam forms bubbles in the liquid phase and the steam bubbles collapse.

6. The process of claim 1, wherein the one or more bubble-forming and bubble-collapsing cycles are performed under hydrothermal conversion conditions.

7. The process of claim 1, wherein 10 to 10,000,00 bubble-forming and bubble-collapsing cycles are performed.

8. The process of claim 1 wherein the hydrothermal conversion step includes a hydrothermal carbonization step that produces an at least partially carbonized solid, and at least one of the one or more of the bubble-forming and bubble-collapsing cycles is performed before carbonized solids are formed to reduce the size of at least some of the feedstock solids.

9. The process of claim 1 wherein the hydrothermal conversion step includes a hydrothermal carbonization step that produces an at least partially carbonized solid, and at least one of the one or more bubble-forming and bubble-collapsing cycles is performed simultaneously with the hydrothermal carbonization step to reduce the size of at least some of the organic feedstock particles and/or of at least some of the at least partially carbonized solid.

10. The process of claim 1 wherein the hydrothermal conversion step includes a hydrothermal carbonization step that produces an at least partially carbonized solid, and at least one of the one or more bubble-forming and bubble-collapsing cycles is performed after the hydrothermal conversion step to reduce the size of the at least partially carbonized solid.

11. The process of claim 1 wherein the hydrothermal conversion step includes a hydrothermal liquefaction step, a wet-air oxidation step, or both a hydrothermal liquefaction step and a wet-air oxidation step, and the at least one bubble-forming and bubble-collapsing cycle is performed before and/or during the hydrothermal liquefaction step, wet-air oxidation step or the hydrothermal liquefaction and wet-air oxidation steps, while solid organic feedstock particles are present.

12. The process of claim 1, wherein the hydrothermal conversion step includes a first hydrothermal carbonization step and at least one subsequent hydrothermal liquefaction step and/or wet-air oxidation step.

13. The process of claim 12, wherein hydrothermal conditions are maintained from the start of the first hydrothermal carbonization step to the end of the last hydrothermal liquefaction and/or wet-air oxidation step, including any intermediate bubble-forming and bubble-collapsing steps.

14. The process of claim 12, wherein at least one of the one or more bubble-forming and bubble-collapsing cycles is performed during the first hydrothermal carbonization step.

15. The process of claim 12, wherein at least one of the one or more bubble-forming and bubble-collapsing cycles is performed during the at least one subsequent hydrothermal liquefaction step and/or wet-air oxidation step.

16. The process of claim 12, wherein at least one of the one or more bubble-forming and bubble-collapsing cycles is performed as an intermediate step after the first hydrothermal carbonization step and before at least one subsequent hydrothermal liquefaction step and/or wet-air oxidation step.

17. The process of claim 1, wherein the at least one bubble-forming and bubble-collapsing cycle produces particles having surface areas of 0.03 $cm^2$ or less.

18. The process of claim 1, wherein the hydrothermal conversion conditions include a temperature of 160 to 400° C. and a pressure above the saturation temperature of water at the temperature.

19. The process of claim 1, wherein the bubble-forming and bubble-collapsing cycles increase the rate of reaction by reducing the particle size and de-agglomerating the feedstock and/or carbonized solids, by improving bulk mixing and/or by providing localized heating due to the heat released when the bubbles collapse.

20. The process of claim 1, wherein each bubble-forming and bubble-collapsing cycle is performed under conditions sufficient to maintain at least a portion of the water in the liquid phase as a liquid.

21. The process of claim 1 which includes multiple steps of subjecting the slurry to hydrothermal conversion conditions, and wherein hydrothermal conditions are maintained continuously from the start of the first step of subjecting the slurry to hydrothermal conversion conditions to the end of the last step of subjecting the slurry to hydrothermal conversion conditions, including any intermediate bubble-forming and bubble-collapsing steps.

* * * * *